United States Patent
Dasgupta et al.

(10) Patent No.: US 8,463,900 B2
(45) Date of Patent: Jun. 11, 2013

(54) SYSTEMS AND METHODS FOR USING WORKLOAD CHARACTERISTICS FOR SIZING AND PLACEMENT FOR POWER-AWARE CONSOLIDATION

(75) Inventors: Gargi B. Dasgupta, Gurgaon (IN); Pradipta De, Kolkata (IN); Ravi Kothari, New Delhi (IN); Tapan K. Nayak, New Delhi (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 12/698,800

(22) Filed: Feb. 2, 2010

(65) Prior Publication Data
US 2011/0191461 A1     Aug. 4, 2011

(51) Int. Cl.
G06F 15/173 (2006.01)

(52) U.S. Cl.
USPC ............ 709/224; 709/226; 370/235; 370/468

(58) Field of Classification Search
USPC .......................... 709/224, 226; 370/235, 468
See application file for complete search history.

(56) References Cited

U.S. PATENT DOCUMENTS

| | | | |
|---|---|---|---|
| 6,118,791 A * | 9/2000 | Fichou et al. | 370/468 |
| 7,788,671 B2 * | 8/2010 | Black-Ziegelbein et al. | 718/105 |
| 2005/0060590 A1 | 3/2005 | Bradley et al. | |
| 2007/0112999 A1 | 5/2007 | Oney et al. | |
| 2008/0008095 A1 * | 1/2008 | Gilfix | 370/235 |
| 2009/0037164 A1 | 2/2009 | Gaither et al. | |
| 2009/0106409 A1 | 4/2009 | Murata | |
| 2009/0187776 A1 | 7/2009 | Baba et al. | |
| 2009/0204826 A1 | 8/2009 | Cox et al. | |
| 2009/0240964 A1 | 9/2009 | Pfeiffer | |

OTHER PUBLICATIONS

Verma, Akshat, et al, "pMapper: Power and Migration Cost Aware Application Placement in Virtualized Systems", IFIP International Federation for Information Processing 2008, Middleware 2008, LNCS 5346, pp. 243-264, 2008.

Kusic, Dara, et al, "Power and Performance Management of Virtualized Computing Environments Via Lookahead Control", IEEE Computer Society, 2008.

Lim, Min Yeol, et al, "PADD: Power-Aware Domain Distribution", IEEE Computer Society, 2008.

Torres, Jordi, et al, "Reducing wasted resources to help achieve green data centers", Barcelona Supercomputng Center (BSC), Barcelona, Spain , Apr. 14-18, 2009.

Srikantaiah, Shekhar, et al, "Energy Aware Consolidation for Cloud Computing", Pennsylvania State University and Microsoft Research, 1996.

Verma, Akshat, et al, "Server Workload Analysis for Power Minimization using Consolidation", IBM India Research Lab, Jun. 14-19, 2009.

* cited by examiner

*Primary Examiner* — Yves Dalencourt
(74) *Attorney, Agent, or Firm* — Ference & Associates LLC

(57) ABSTRACT

Embodiments of the invention provide power savings via performing application workload consolidation to servers using off-peak values for application workload demand. Embodiments of the invention are designed to achieve significant power savings while containing performance risk associated with server consolidation.

20 Claims, 12 Drawing Sheets

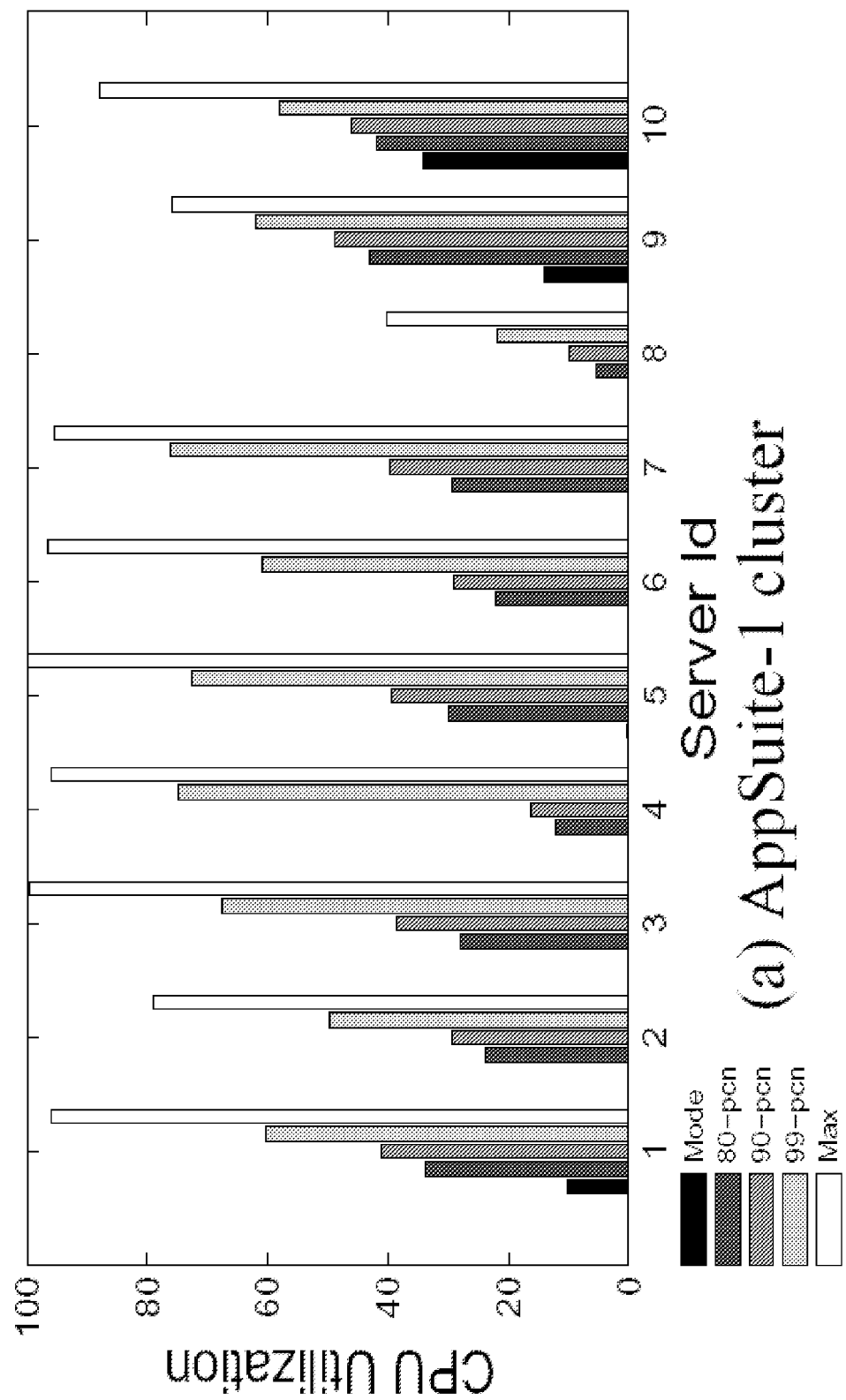

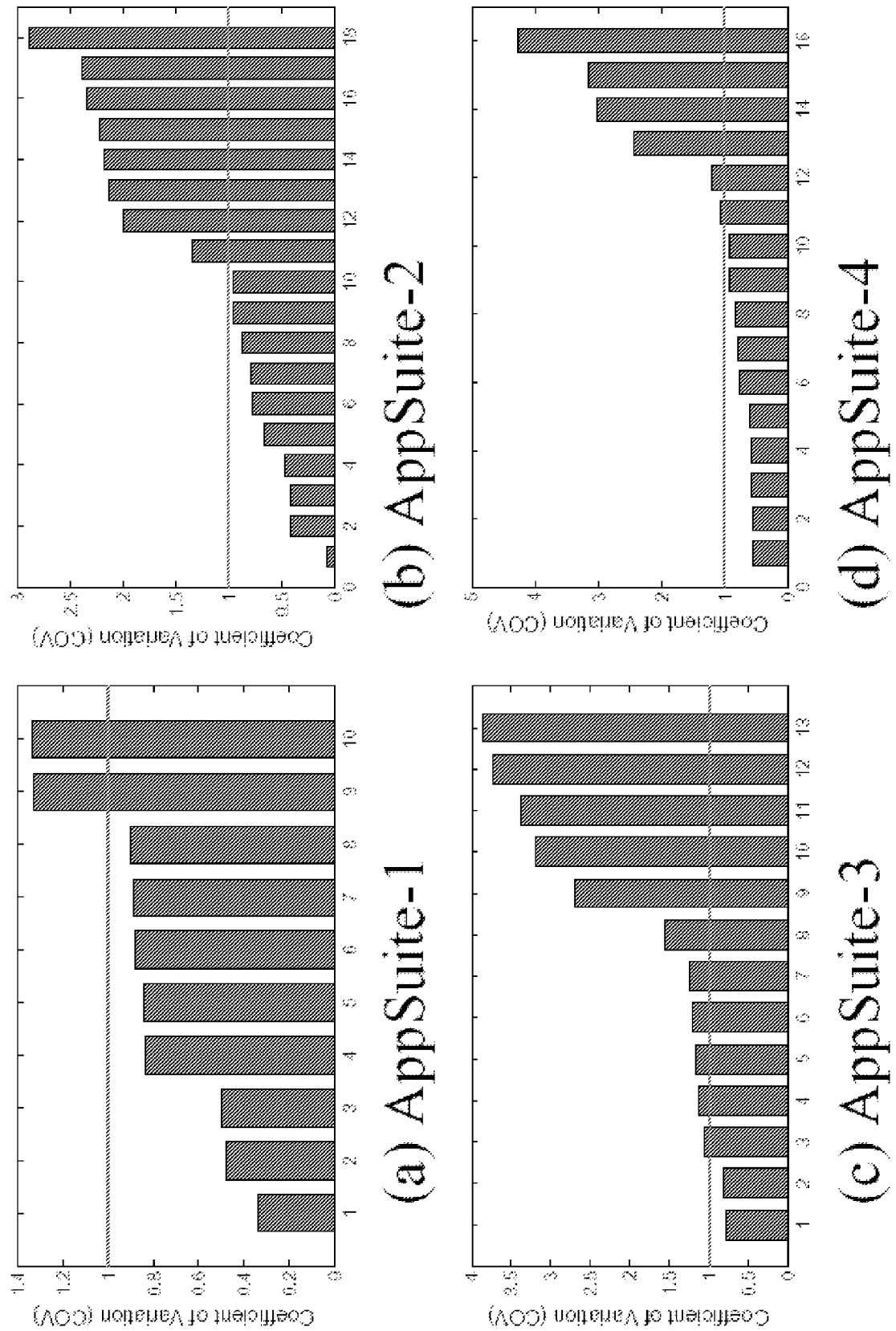
FIG. 2(a)-(d)

SYSTEMS AND METHODS FOR USING WORKLOAD CHARACTERISTICS FOR SIZING AND PLACEMENT FOR POWER-AWARE CONSOLIDATION

BACKGROUND

The subject matter described herein generally relates to power saving techniques via server consolidation. It is largely agreed that infrastructure and energy (I&E) costs are the largest contributor to the cost of operating a data center and are generally much larger than IT costs. Therefore, reducing the cost of I&E is a major initiative of most data centers. One promising approach for reducing the I&E costs, prompted by virtualization and hardware-assisted isolation, is server consolidation.

Server consolidation is based on the observation that many enterprise servers do not maximally utilize the available server resources all of the time. Co-locating applications, perhaps in individual virtual machines, thus allows for a reduction in the total number of physical servers, minimizes server sprawl as well as the total data center space requirements.

Consolidation reduces the total power consumed by the applications because existing servers are not energy proportional; that is, a significant amount of power is consumed even at low levels of utilization. Though server features like voltage and frequency scaling modify this curve, there is still substantial power drawn at idle or low utilization. Consolidation thus provides an opportunity to reduce the overall power consumed by operating the servers in a range with a more attractive performance/Watt. However, effective consolidation is difficult.

BRIEF SUMMARY

Embodiments of the invention provide systems, methods, apparatuses and program products that provide efficient server consolidation for maximum power savings. Embodiments of the invention leverage a detailed analysis of a server workload, from the perspective of finding characteristics for consolidation, to perform consolidation using off-peak values for application demand and to implement consolidation methods designed to achieve significant power savings while containing the performance risk of consolidation.

In summary, one aspect of the invention provides a method comprising: utilizing one or more processors to execute a program of instructions stored in a program storage device, the program of instructions configured for clustering application workloads for placement on one or more servers and comprising: computer readable program code configured to identify application workloads that are similar and cluster similar workloads to create one or more application workload clusters; and computer readable program code configured to automatically consolidate application workloads to the one or more servers utilizing a first parameter describing an application workload and a second parameter describing an application workload; the first parameter representing a typical resource usage of an application workload; the second parameter representing a maximum resource usage of an application workload.

Another aspect of the invention provides an apparatus comprising: one or more processors; and a computer readable storage medium having a program of instructions embodied therewith and executable by the one or more processors, the program of instructions comprising: computer readable program code configured to cluster application workloads to be consolidated; and computer readable program code configured to automatically consolidate application workloads to the one or more servers utilizing a first parameter describing an application workload and a second parameter describing an application workload; the first parameter representing a typical resource usage of an application workload; the second parameter representing a maximum resource usage of an application workload.

A further aspect of the invention provides a computer program product comprising: a computer readable storage medium having computer readable program code embodied therewith, the computer readable program code comprising: computer readable program code configured to cluster application workloads to be consolidated; and computer readable program code configured to automatically consolidate application workloads to the one or more servers utilizing a first parameter describing an application workload and a second parameter describing an application workload; the first parameter representing a body of the distribution of the application workload use of server capacity; the second parameter representing a tail of the distribution of the application workload use of server capacity.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 (a)-(d) illustrates Coefficient of Variation (COV) of exemplary servers.

DETAILED DESCRIPTION

Figure 1B:
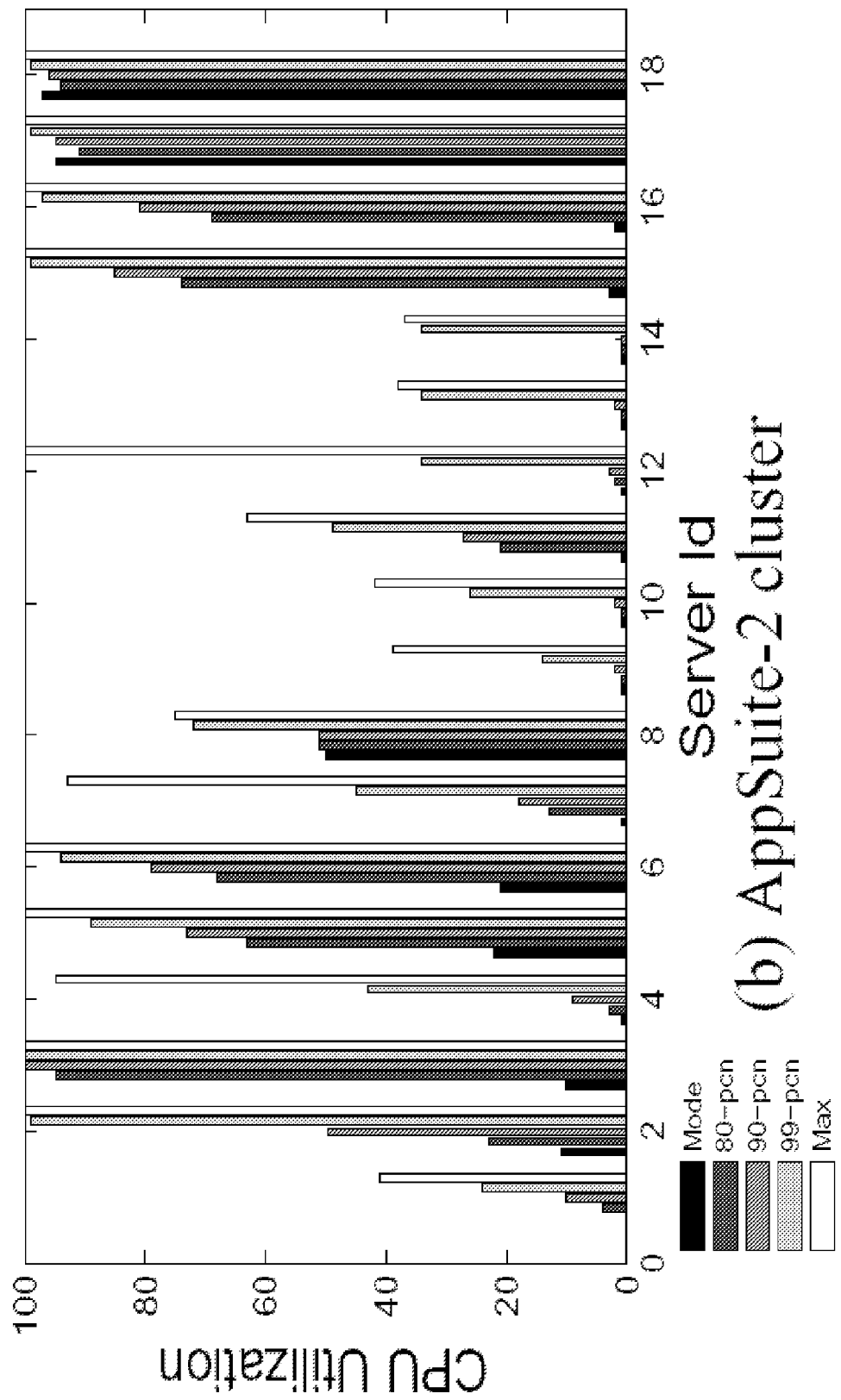
FIG. 1 (a)-(b) illustrates CPU utilization of exemplary servers.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

According to an estimates based on trends from American Society of Heating, Refrigerating and Air Conditioning Engineers (ASHRAE), by 2014, Infrastructure and Energy (I&E) costs would contribute about 75 percent, while IT would contribute a significantly smaller 25 percent, towards the overall total cost of operating a data center. While there may be a difference in opinion on the relative proportion of I&E and IT costs, there is little disagreement that I&E costs would comfortably be the largest contributor to the cost of operating a data center. Reducing the I&E costs is thus a major initiative of most data centers. One promising approach, prompted by virtualization and hardware-assisted isolation, for reducing the I&E costs is server consolidation.

Server consolidation is based on the observation that many enterprise servers do not maximally utilize the available server resources all of the time. Co-locating applications, perhaps in individual virtual machines, thus allows for a reduction in the total number of physical servers and minimizes server sprawl as well as the total data center space requirements.

Consolidation reduces the total power consumed by the applications because existing servers are not energy proportional, i.e., a significant amount of power is consumed even at low levels of utilization. Though server features like voltage and frequency scaling modify this curve, there is still substantial power drawn at idle or low utilization. Consolidation thus provides an opportunity to reduce the overall power consumed by operating the servers in a range with a more attractive performance/Watt. For example, if two identical servers each utilizing, say 40 percent of the resources and drawing 80 percent of peak power were consolidated onto a single server, the consolidated server would be able to deliver identical performance at significantly less than the 160 percent (80+80) of the peak power. However, a key to effective consolidation is to estimate the (time-varying) resource requirements of individual applications (virtual machines) and to utilize these estimates along with the power profile of the physical servers to determine the consolidation strategy that can provide the best space-power benefits.

Server consolidation can be loosely broken into static, semi-static and dynamic consolidation. In static consolidation, applications (or virtual machines) are placed on physical servers for a long time period (for example, months or years), and not migrated continuously in reaction to load changes. Semi-static refers to the mode of consolidating these applications on a daily or weekly basis. On the other hand, dynamic consolidation spans a couple of hours and requires a runtime placement manager to migrate virtual machines automatically in response to workload variations. Many virtualization vendors provide some tooling support for static consolidation with third party providers providing add-on features for inferring hardware constraints etc.

However, these tools essentially provide a policy-based framework with user defined policies and the placement intelligence is fairly simplistic. While multiple dynamic placement frameworks have been researched, in practice, administrators are often reluctant to migrate virtual machines automatically. Instead they prefer an offline or semi-offline framework, to evaluate the proposed placement and manually approve it. Hence, static and semistatic consolidation, where consolidation is performed daily or weekly is currently a much more appealing technique for administrators in real data centers. Though server consolidation for minimizing server sprawl or power has been attempted using conventional techniques, as described herein, embodiments of the invention, in contrast, utilize correlation between workloads in a systematic way for determining the most effective static consolidation configuration.

While dynamic workload placement has been a well-studied problem, it assumes that there is minimal change in the resource requirement of the application during the (typically short) consolidation interval and hence a single resource size suffices. In the past, it has been assumed that the same assumption holds for static consolidation. However, for longer term consolidation there are significant reasons why this assumption fails. First, over a longer period of time, one is likely to see periods of peak as well as reduced application demand. Second, placement decisions made based on historical data may not be accurate due to a systematic drift in the load. Third, there is an opportunity to utilize correlation between resource utilization on different virtual servers to influence the consolidation decision. Finally, long term placement has additional objectives like workload balance on active servers.

Thus, generally a static consolidation framework needs to deal with stochastic variables instead of fixed variables and the behavior of these variables need to be well understood. Identify the right parameters to size workloads for medium or long intervals and assessing their impact is of increased importance. It can also be important to understand how correlation between applications can be employed for a more effective consolidation. The stability of various workload parameters should be studied thoroughly to identify the risks involved in consolidation. Finally, existing placement methodologies should be understood in light of the results of the workload characterization and should be modified, as needed.

Accordingly, embodiments of the invention provide a systematic server workload characterization of a large data center from the perspective of medium (semi-static) or long term (static) consolidation. By studying the distribution of the utilization and occurrence of the peak utilization on servers relative to various percentiles and average metrics, the inventors have found that the tail of the distribution does not decay quickly for most servers. This implies that sizing applications based on average utilization has high degree of risk. The inventors have also observed significant correlation between applications hosted on different servers. The inventors have observed that certain metrics, for example the 90-percentile as well as cross correlation between applications, are fairly stable over time.

These insights obtained from workload characterization have been used to design embodiments of the invention that implement two new consolidation methodologies, namely Correlation Based Placement (CBP) and Peak Clustering based Placement (PCP). These methodologies are implemented according to embodiments of the invention in a consolidation planning tool. As described herein, exemplary implementations of embodiments of the invention have been evaluated using traces from a live production data center. These evaluations clearly establish the superiority of the proposed algorithms. Non-limiting and exemplary scenarios in which each methodology is effective are described herein.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In order to demonstrate the need for a system-level workload characterization, some background regarding server consolidation is useful. Therefore, a generalized formulation for server consolidation is presented. The consolidation exercise can be formally stated as follows. Let there be N applications $A_i$ that need to placed on M physical servers $S_j$ for the period T. For each application $A_i$, let $C(A_i,t)$ denote the resource required in order in order to meet its SLA at time t. The problem of translating an application SLA to a resource value is not dealt with herein and it is assumed that $C(A_i, t)$ are available from monitored resource data.

Let the capacity of a physical server $S_j$ be denoted by $C(S_j)$ and X denote a specific consolidation configuration to specify the placement of applications on physical servers, that is, an element of X, say $x_{i,j}=1$ if application $A_i$ is placed on server $S_j$ and 0 otherwise. Consolidation requires finding a configuration that optimizes a given cost function. For example, if the objective of consolidation is to optimize power, then we want to find a configuration X that minimizes P(X), where P(X) is a real valued function that provides the power consumed for a specific placement of applications. Further, the placement should ensure that the resource requirements for all applications are met for the entire duration T, that is, $\forall t \epsilon T, \sum_{i=1}^{N} x_{ij} C(A_i,t) \leq C(S_j)$. Further, it should be ensured that all applications are placed, that is, $\sum_{j=1}^{M} x_{ij}=1$.

Dynamic consolidation assumes that T is very short, leading to a single time-independent capacity demand $C(A_i)$ for each application. Hence, the capacity constraint is no longer stochastic in nature. In dynamic consolidation, for the estimation of $C(A_i)$ and $C(S_j)$, a popular metric in use is the RPE2 metric from IDEAS and almost all the commonly used servers are bench marked with a fixed RPE2 value. The RPE2 value of the server is used for $C(S_j)$ whereas the resource requirements of the application are estimated from the CPU utilization of the server. More specifically, if virtualization is not in use, then the RPE2 of the host server multiplied by the maximum CPU utilization of the server in the period is used as an estimate of the resource requirements (size) of the application. If virtualization is in use, then the size is computed based on the entitlement of each virtual server on its host physical server, the CPU utilization of the virtual server, and the RPE2 of the host server.

As described herein, data center administrators do not prefer dynamic consolidation, due to its automated nature. Instead, they opt for static or semi-static consolidation strategies where they can manually verify and approve the new configuration. However, for static or semi-static consolidation, a problem is to identify a size parameter that is useful for longer periods. Typically, an administrator will migrate virtual machines at the end of the day or on an identified day of the week. For such long duration, it is imperative to use a size that is able to save a lot of power (by consolidating on a few power efficient machines) as well as ensure that no SLA capacity violations would happen during periods of high load. Hence, the two important objectives in static consolidation are (i) Overall Power Consumption and (ii) SLA Violation, defined as number of time instances, when the capacity of server is less than the demand of all applications placed on $\sum_{i=1}^{N} x_{ij} C(A_i,t) > C(S_1)$.

Existing research in workload modeling can be classified into (a) aggregate workload characterization and (b) individual server utilization modeling. However, these do not provide a characterization of the inter-relationship between various workloads, as needed for static consolidation.

Accordingly, embodiments of the invention leverage server workload analysis. A non-limiting example of such workload analysis is described herein. Some details of the exemplary workload analyzed are as follows.

The exemplary workload analyzed was collected from the production data center of a multi-national Fortune Global 500 company. The data center runs the core business applications of the enterprise as well as a service delivery portal. Each separate application suite was run from its own server cluster with a dedicated application team. Every application component in a suite ran from a dedicated virtual server, with many virtual servers hosted on a (typically) high-end physical server. The traces were collected by the MDMS monitoring framework deployed in the data center. The framework used its own sensors to collect CPU utilization for all the virtual servers with one entry every 5 minutes. Traces collected over a ninety day period in the year 2007 were used for the exemplary analysis presented herein. It should be noted that in connection with the description of the exemplary workload analysis, the terms server and application are used interchangeably, as each trace data corresponded to exactly one virtual server and application component.

The tracing methodology depends on sensors deployed in actual production servers over a long period. Hence, the data was noisy in parts due to routine system maintenance (server reboots, performance troubleshooting that terminated all daemons, including the sensors). Thus, the traces had missing or incorrect data for many time intervals during the trace period. A simple interval graph technique was used to identify the longest contiguous interval, where all the servers in one cluster had monitored data available. Hence, for each server cluster, a smaller period was identified which had accurate monitored data available and these smaller periods were used for the exemplary analysis.

The data center had a large number of clusters and 4 representative clusters were selected (Table 1) for this analysis. "AppSuite-1", "AppSuite-2" and "AppSuite-4" had a two-tiered application with application server components and DB server components. "AppSuite-3" was a three-tiered application suite with a few web servers, a few application servers, and a few DB servers. In most cases, multiple application servers used a common DB server. However, for "AppSuite-2", few application servers had dedicated DB servers assigned to them. There were no restrictions on co-locating two or more components of an application suite on the same physical server.

TABLE 1

Workload Details for Each Cluster

| Suite-Name | # of Servers | # of Days |
|---|---|---|
| AppSuite-1 | 10 | 19 |
| AppSuite-2 | 18 | 13 |
| AppSuite-3 | 13 | 25 |
| AppSuite-4 | 16 | 37 |

Some observations from the exemplary workload analysis presented herein will focus on "AppSuite-1" for brevity and be expanded as necessary for certain observations. CPU utilization data of each server in "AppSuite-1" yielded an important observation: that all servers (excluding one) reached a CPU utilization of 100 percent at some point in time during the duration of the trace. This had an important implication for consolidation.

Observation 1: If consolidation is performed by reserving the maximum utilization for each application, the application may require capacity equal to the size of its current entitlement.

This observation was reinforced by analyzing the Cumulative Probability Distribution (CDF) of CPU utilization for each server of "AppSuite-1". An interesting observation in the CDF plot was a large skew in the distribution (not shown). For most of the applications, the CPU utilization at the 90-percentile of the distribution is less than half of the peak CPU utilization. Such a skew can be utilized for a tighter consolidation by provisioning less than peak resource consumed by each application.

In FIG. 1(a), CPU utilization of servers in "AppSuite-1" is presented. It is illustrated that the 99-percentile CPU utilization value was significantly less than the maximum CPU utilization in many cases. This is in line with observations on other enterprise workloads. Interestingly, the 90-percentile CPU utilization was about half or less of the maximum CPU utilization for 9 out of 10 servers. Moreover, the gap between the 80 and 90-percentile values was less than 10 percent CPU utilization in all cases and less than 5 percent in many cases. Other server clusters ("AppSuite-2", "AppSuite-3", and "AppSuite-4") yielded similar results. However, in the "App-Suite-2" cluster (FIG. 1(b)), a few servers had high utilization (Servers 15 to 18) for most of the interval. Hence, in these cases, both the 80 and 90-percentile values are reasonably close to the peak CPU utilization. The above findings lead to a second important observation.

Observation 2: If an application can be used based on 90-percentile CPU utilization instead of maximum CPU utilization, it could lead to significant savings.

Next, the variability of the CPU utilization for different servers was examined. To measure the variability, the coefficient of variation (COV) for all the applications in a cluster was computed. The coefficient of variation is a normalized measure of dispersion of a probability distribution and is defined as $COV=\sigma/\mu$, where $\sigma$ is the standard deviation and $\mu$ is the mean of the distribution. COV is a useful statistic for comparing the degree of variation and equals 1 for exponential distribution. Distributions with COV>1 (such as a hyper-exponential distribution) are considered high-variance, while those with COV<1 are considered low-variance. The coefficient of variations for all the clusters are shown in FIG. 2.

It is illustrated in FIG. 2 that all clusters have at least a few applications with high-variance distributions and "AppSuite-3" has the largest number of applications with COV>1. There are also applications with low-variance distributions. However, it is known that combining a heavy tailed distribution, COV>1, to another independent (or positively correlated) distribution with an exponentially decaying tail, COV=1, leads to an aggregate distribution, which is heavy-tailed. This leads to a third important observation.

Observation 3: If a statistical measure that ignores the tail of the distribution is used for sizing an application, the consolidated server may observe a large number of SLA capacity violations.

The first three observations bring out potential savings if applications were sized based on percentile values as opposed to peak values. However, sizing based on a non-peak value may lead to significant SLA violations if co-located applications peak together. Hence, next the correlation between applications belonging to the same application suite is examined. The correlation between a pair of applications with time series $\{x_1, x_2, \ldots x_N\}$ and $\{y_1, y_2, \ldots y_N\}$ is represented by the Pearson correlation coefficient, $$r_{xy} = \frac{N\sum x_i y_i - \sum x_i \sum y_i}{\sqrt{N\sum x_i^2 - (\sum x_i)^2}\sqrt{N\sum y_i^2 - (\sum y_i)^2}}$$

In considering a pair-wise correlation between the applications of "App-Suite1" (not shown), it can be observed that there are many applications that have significant positive correlation. On the other hand, there are also a few applications that have minimal correlation with other applications. These observations highlight that (a) there is a risk of SLA violation if consolidation methods are not aware of correlation and (b) there is potential for placing non-correlated applications to mitigate this risk. The other clusters have less correlation between servers but there are still a significant number of servers (more than 25%) that exhibited correlation with one or more other servers. One may observe that virtual servers that are part of a multi-component application have a high likelihood of being correlated. However, since in most cases, multiple (four or eight) application servers were sharing a common DB server, the correlation was not strong. "App-Suite2" however had four (application server, DB server) pairs that were dedicated. As a result, even though the workload to this suite had low intrinsic correlation, the two-tier nature of the application suite introduced correlation.

Hence, multi-tier applications with a one-to-one mapping between servers in different tiers are likely to exhibit correlation even for workloads with no intrinsic correlation. This leads to our next important observation.

Observation 4: There are both positively correlated and uncorrelated applications in a typical server cluster. Hence, correlation needs to be considered during placement to avoid SLA capacity violations.

Thus far, the correlation coefficient has been used as an indicator of the temporal similarity between two applications. However, correlation is a comprehensive metric that captures temporal similarity between two applications at all levels (both peak and off peak). Capacity violations, though, occur when two applications sized by an off-peak value peak together. Hence, the correlation between only the peaks for various applications can be examined. In this context, it can be observed that there are applications with low correlation, but whose peaks may be correlated. Further, there also exists correlated applications whose peaks typically do not occur at the same time. This leads to another useful observation.

Observation 5: Correlated Applications may not always peak together. Similarly, non-correlated applications may also peak together in some cases.

Regarding the need for stability analysis, static and semi-static placement decisions are made for extended periods of time. Hence, the stability of workload statistical properties should be analyzed to ensure the reliability of the placement decisions. Thus, presented herein are workload periodicity, variation in statistical properties like mean, 90-percentile and correlation co-efficient, over the observation period in the exemplary workload analysis.

First is analyzed the periodicity of the collected data. It will help to find the repeating patterns, such as the presence of a periodic signal that has been buried under noise. The usual method for deciding if a signal is periodic and then estimating its period is the auto-correlation function. For a discrete time series $\{x_1, x_2, \ldots x_N\}$ with mean $\mu$ and variance $\sigma^2$, the auto-correlation function for any non-negative integer k<N is given by:

$$R(k) = \frac{1}{(N-k)\sigma^2} \sum_{n=1}^{N-k} [x_n - \mu][x_{n+k} - \mu],$$

Essentially, the signal $\{x_n\}$ is being convolved with a time-lagged version of itself and the peaks in the auto-correlation indicate lag times at which the signal is relatively highly correlated with itself; these can be interpreted as periods at which the signal repeats. To enhance the analysis, also computed were the magnitude spectrum of the timeseries, $|X_k|$, where $\{X_k\}$ is the Discrete Fourier Transform (DFT) of $\{x_n\}$ and is defined by:

$$X_k = \frac{1}{N} \sum_{n=1}^{N} x_n e^{-\frac{2\pi i}{N}(k-1)(n-1)}, \; 1 \le k \le N.$$

In examining the auto-correlation function and magnitude spectrum of the utilization data for all the applications of the exemplary workload example, it has been found that some servers exhibit nice periodic behavior, whereas some servers do not follow any particular pattern. FIG. 7 shows a periodic pattern with a time period of one day as the lag between two consecutive peaks in the auto-correlation function is one day and there is a peak in the magnitude spectrum corresponding to it.

This kind of workload can be predicted with significant reliability. Many applications do not show any periodic pattern in the observed period; however, the statistical properties remain consistent over a long period. To analyze the consistency, the mean and 90-percentile statistics over several windows of length 1 day were computed. Although the workload may have no periodic pattern, the mean and 90-percentile statistics may remain stable (as observed for the exemplary workload data). Hence, for such workloads, the statistics can be estimated reliably. A third category of applications neither showed any periodic behavior, nor any statistical consistency over a long period. However, for these applications, the moving averages followed the actual mean and 90-percentiles closely and can be used for estimation. These observations lead to the following observation.

Observation 6: Some servers exhibit periodic behavior and the future pattern can be reliably forecasted with a day or a week of data. For many non-periodic servers, the statistical properties are fairly stable over time. For highly variable servers, an adaptive prediction method like Moving Average should be used to estimate the statistical properties.

In the exemplary workload data, it was observed that correlation between applications should be used while making placement decisions. Examined next was the stability in correlation for "AppSuite-1", which has the highest correlation amongst all the exemplary clusters. For this purpose, the correlation between all pairs of applications was computed for every day separately during the whole duration of the trace and the standard deviation across these daily correlation values was computed. It was observed that that the standard deviation was fairly low, indicating the stability of correlation across time.

Observation 7: The correlation between the CPU utilization of various servers is fairly stable across time.

The described observations were utilized in designing various embodiments of the invention. Thus, embodiments of the invention are configured to implement one or more placement strategies for maximum power savings.

pMapper power-aware application placement methodology and system has been previously described in the context of a runtime placement controller. pMapper minimizes fragmentation using an enhancement of First Fit Decreasing (FFD) bin-packing algorithm and uses a novel Order Preservation property to select the right server for any application being migrated in order to minimize power. The algorithm optimizes the use of one resource (typically CPU utilization) during packing and treats other resources (e.g., memory, I/O) as constraints. Hence, it always comes up with a feasible packing for all resources but allocates only one resource in an optimized manner. The methodology used by pMapper does not focus on resource sizing of each VM for the next placement interval, which is predicted by a Performance Manager. An important thing to note here is that pMapper is designed for short consolidation intervals. There are two important implications of such an approach. Firstly, each application is sized independently and a single number is used to size an application. Secondly, as placement decisions need to be aware of application migration costs, few applications are migrated and the relocation decision takes an existing (old) placement into account. However, such an approach can still be applied for static consolidation with much longer consolidation intervals.

To operate in a static placement scenario, the pMapper methodology is adapted by sizing an application based on the peak resource usage of the application in the (longer) placement period. Note that in the case of SLA governed data centers, one can use less strict sizing functions. For example, if the SLA requires that resource requirements are met for at least 99 percent of the time, one could use a VM size that ensures a tail violation probability of 1 percent. Similarly, one may also choose to size all applications based on a metric like mode or median, if short-term violations are acceptable. This family of placement methodologies using peak, percentile, mode, et cetera based sizing are termed herein as existing placement methodologies.

Correlation Based Placement:

An embodiment of the invention that leverages the observations made from workload analysis (such as the exemplary workload analysis described herein) to place applications in a more effective manner is referred to herein as utilizing the Correlation Based Placement (CBP), and is based on the following important observations.

1) The peak resource usage of an application is significantly higher than the resource usage at most other times (for example, consider a 7 day period. The maximum CPU utilization for an application on the server in this period may be 100% of the server's capacity. However, during 90 percent of this 7 day period (or 90 percent cumulative density function (cdf)), the application may be using no more than 20% of the server's capacity.

2) If applications are sized by an off-peak metric and correlated applications are placed together, there is a high risk of SLA capacity violation.

3) If two uncorrelated applications are placed together and sized individually for a violation probability of X %, the probability that both of them would violate their sizes at the same time is $(X^2)$ %.

To take an example, consider two applications $A_1$ and $A_2$. Assume that both $A_1$ and $A_2$ have a maximum size of 1000 RPE2 units with a 90 percentile value of 500 RPE2 units. Further, assume that $A_1$ and $A_2$ are uncorrelated with each other. It is now easy to see that if we place $A_1$ and $A_2$ on a single server and allocate 500 RPE2 units each to both the applications, the probability that both of them would exceed their allocation at the same time is only 1 percent. Hence, provisioning based on 90 percentile and placing uncorrelated applications together can lead to a potential savings of 50 percent over the peak based sizing method.

Thus, embodiments of the invention operating via CBP use utilize such ideas to size individual applications based on a tail bound instead of the maximum size of the application. Further, embodiments of the invention add co-location constraints between positively correlated applications so that two such applications are not placed on the same server. The number of actual constraints added can be controlled using a tunable Correlation Cutoff. Hence, CBP proceeds in very similar manner to the pMapper algorithm with few key differences, outlined below.

First, add co-location constraints are added between any two positively correlated application pairs $A_i$, $A_i'$ that exhibit a correlation coefficient above the correlation threshold. Second, applications are sized based on a tail bound instead of the maximum value. Third, in the inner loop of pMapper where the most power-efficient server $S_j$ that has resources for an application $A_i$ is found, a check is also made if none of the already placed applications on $S_j$ have a colocation constraint with $A_i$. If indeed there is such an application, the server is marked as ineligible and the next server is considered for placing the application.

It is easy to see that CBP incurs an overhead in the computation of correlation for all application pairs.

Theorem 1: Given N applications and a time series with d points, CBP takes $O(N^2 d)$ time to find the new placement.

Thus, embodiments of the invention utilize a CBP methodology that takes an existing dynamic consolidation algorithm and adapts it to work in a static or semi-static consolidation scenario. CBP adds co-location constraints between correlated applications to ensure that an application can be sized based on an off-peak value. However, it adds a hard constraint between correlated applications.

Figure 3A:
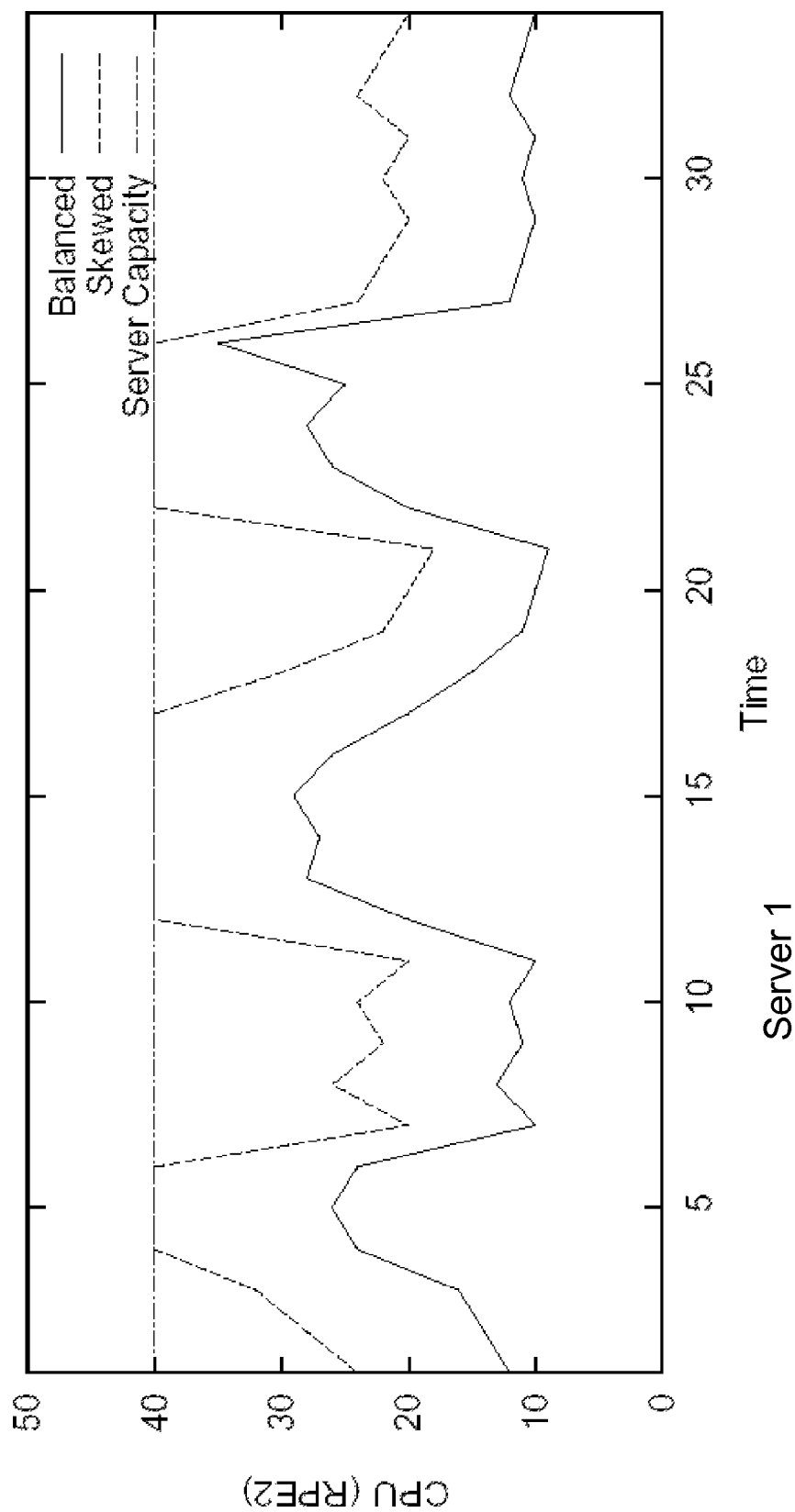
FIG. 3 (a)-(b) illustrates CPU utilization of exemplary servers.
Figure 3B:
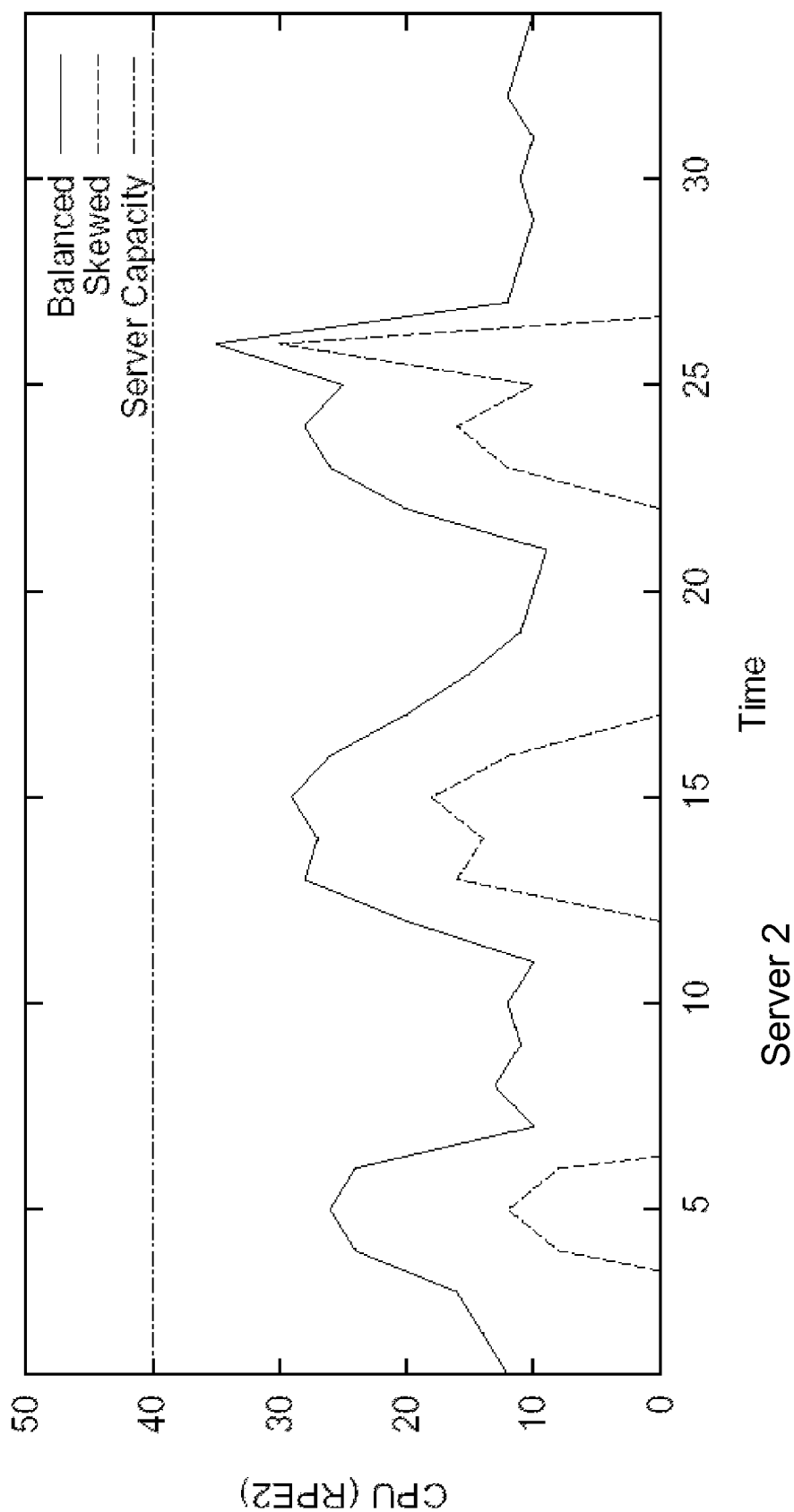

Taking a closer look at the problem will help in understanding the nature of the optimal solution. Consider a set of 6 applications that need to be placed on a set of servers, each with a capacity of 40. There are two potentially fractional optimal solutions, as shown in FIG. 3(a)-(b). A balanced solution would pack half of the time series in the first server and the other (balanced) half in the other server. A skewed solution would pack the first server to the maximum capacity and pack the remaining applications in the second server.

CBP and other dynamic consolidation algorithms aim to approach the skewed optimal solution. However, from an administrative point of view it may be preferred to have balanced workload across all active servers.

A second problem with CBP may arise when there are many correlated applications. In the above example, if there were three applications that are positively correlated, a minimum of three servers would be needed to satisfy the colocation constraints. Finally, computing the correlation between all pairs of applications is expensive (quadratic in nature) and may not be applicable for large number of applications and trace periods.

Peak Clustering Based Placement:

The issues outlined above regarding CBP are addressed according to embodiments of the invention with a new consolidation method referred to herein as Peak Clustering based Placement (PCP). PCP is based on the following fundamental observations: 1) Correlation between peaks of applications is more important than correlation across the complete time series of the applications. 2) A set of applications that peak together are distributed evenly across all active servers in the optimal solution; however, two applications with correlated peaks may still be co-located. 3) Co-located applications that do peak together can use a common buffer for their peaks and each have a reservation equal to an off peak value.

Figure 4:
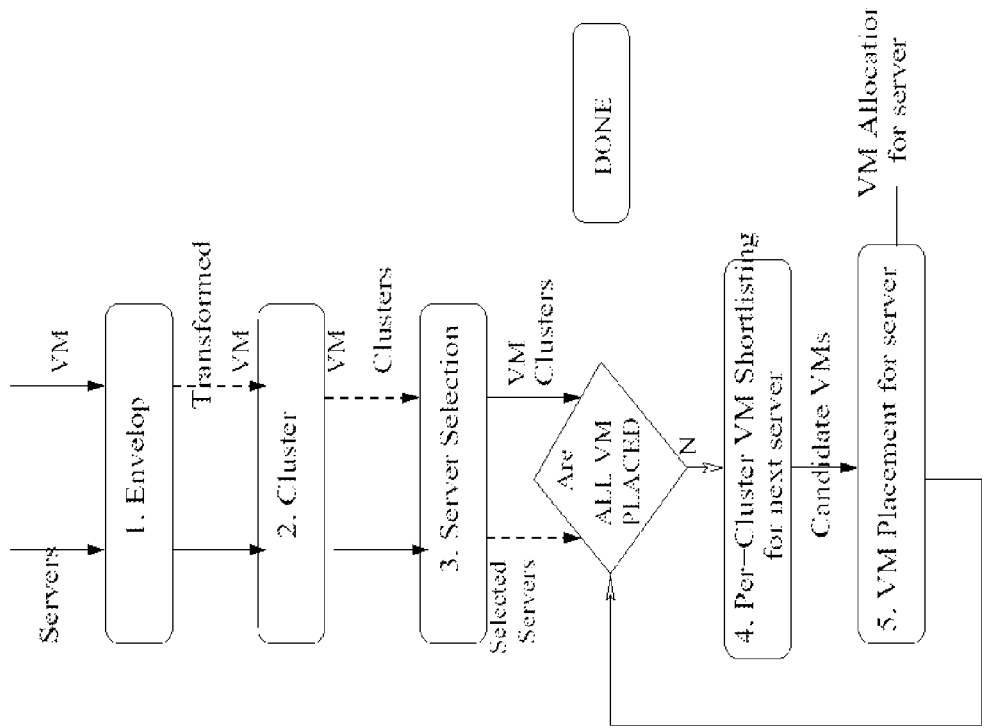
FIG. 4 illustrates an exemplary method for application workload server consolidation.

Embodiments of the invention implementing PCP use these ideas to first identify clusters of applications with correlated peaks. One may observe that the number of such clusters may become very large if the original time series is used with the complete range of values. Hence, PCP uses a novel two-level envelop of the original time-series of each application for clustering. The envelop has a single value to represent all CPU utilization for the body of the distribution and another value for all points in the tail of the distribution. On each active server, it then reserves space for each cluster in proportion to the size (lower level of envelop) of the applications in that cluster and keeps a buffer space equal to the maximum peak across all clusters. Each application cluster shortlists a set of applications for its reservation and PCP does a final selection of applications for the server. The overall flow of PCP is described in FIG. 4.

Figure 5A:
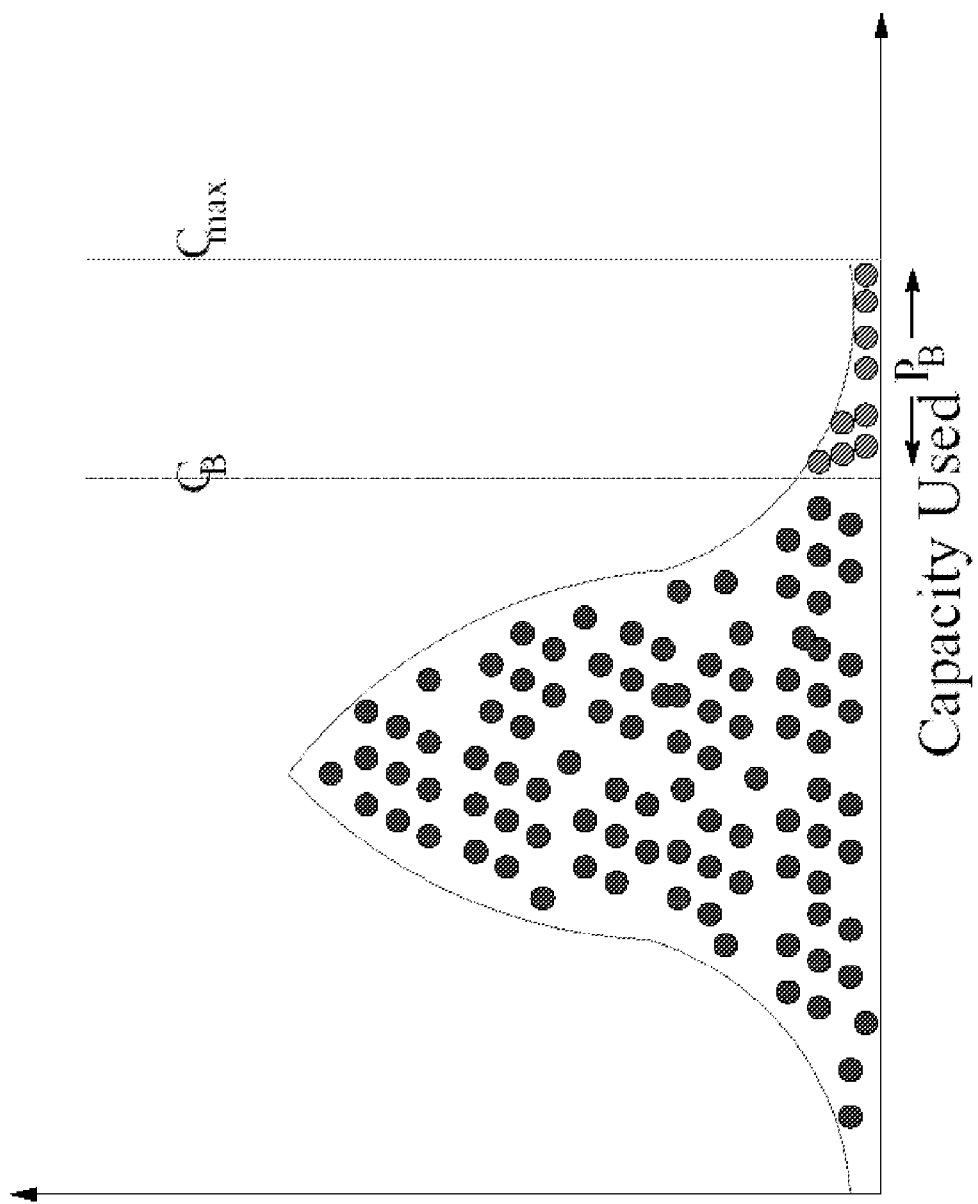
FIG. 5 (a)-(b) illustrates application workload demand distributions for server capacity.
Figure 5B:
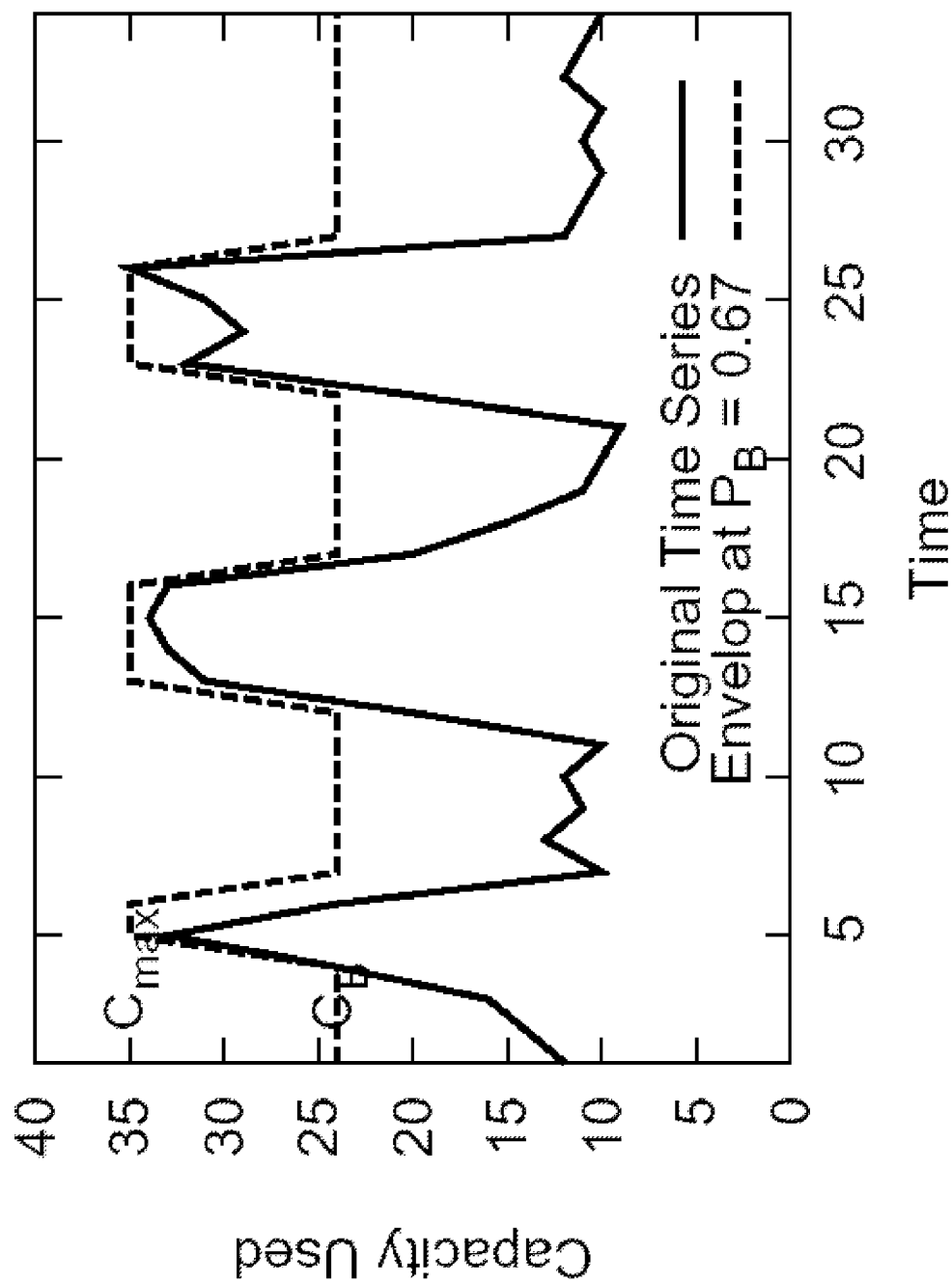

As a non-limiting example, PCP starts by using an Envelop function that transforms the original time series for each application to a two-level envelop. Given any tail bound $P_B$ (for example, 10 percent), the Envelop computes a value $C_B$ such that the probability that application's CPU usage exceeds $C_B$ is bounded by $P_B$. It also identifies the maximum capacity used by the application as $C_{max}$ (FIG. 5(a)-(b)). The original time series is then transformed by a two-level time series in the following manner.

If at a given time, the capacity used by the application is greater than $C_B$, it is replaced with $C_{max}$. Otherwise, it is replaced with $C_B$. Hence, the body of the distribution is replaced by $C_B$ and is referred to as size. The tail is replaced by $C_{max}$. The time series for the transformed VM is stored as a set of ranges during which the size $C_B$ is exceeded. The next step in PCP is to cluster workloads based on the correlation of their peak ranges. The clustering step uses a similarity function to identify workloads with correlated peaks. For each application $A_i$, the similarity function is used to identify if the envelop of the application is covered by any existing cluster center. If no such cluster center exists, then a new cluster is started with $A_i$ as the cluster center.

Next in the overall flow of PCP is to sort servers based on their power efficiency. The marginal power efficiency for a server with capacity $Cap_j$ running at capacity $\rho_j$ is defined as the slope of the capacity versus power curve at $\rho_j$ capacity and overall power efficiency of the server as the ratio of the capacity of the server $Cap_j$ to the peak power consumed by the server. The server selection method in previous work used marginal power efficiency as the metric to sort servers. Dynamic consolidation requires changes to be made in an incremental, online manner from an existing configuration and hence, marginal power efficiency is a good metric for server selection. On the other hand, static consolidation may involve multiple global changes and hence, overall power efficiency is used to rank servers in PCP.

The final steps in PCP pack all the applications on the minimal number of servers, while packing the more power efficient servers first. The method picks the next highest ranked server and selects a set of applications from each cluster in a proportional manner. Given a server with capacity $Cap_j$ to pack and a set of applications yet to be placed, the sum of the sizes ($C_B$) of all remaining applications is calculated as TotalSize. For each cluster $M_k$, calculated are the sum of the sizes, $Size_k$, of its applications and $Peak_k$, as the sum of the peak buffers ($C_{max}-C_B$) of its applications. Also calculated are MaxBuffer as the maximum of the peak buffers across all clusters. Once these metrics are computed, each cluster $M_k$ selects a set of applications such that the overall size, $CandSize_k$, and peak buffer $CandBuffer_k$ of the cluster is given by:

$$CandSize_k = \frac{Size_k}{TotalSize + MaxBuffer}$$

$$CandBuffer_k \leq MaxBuffer$$

Figure 6:
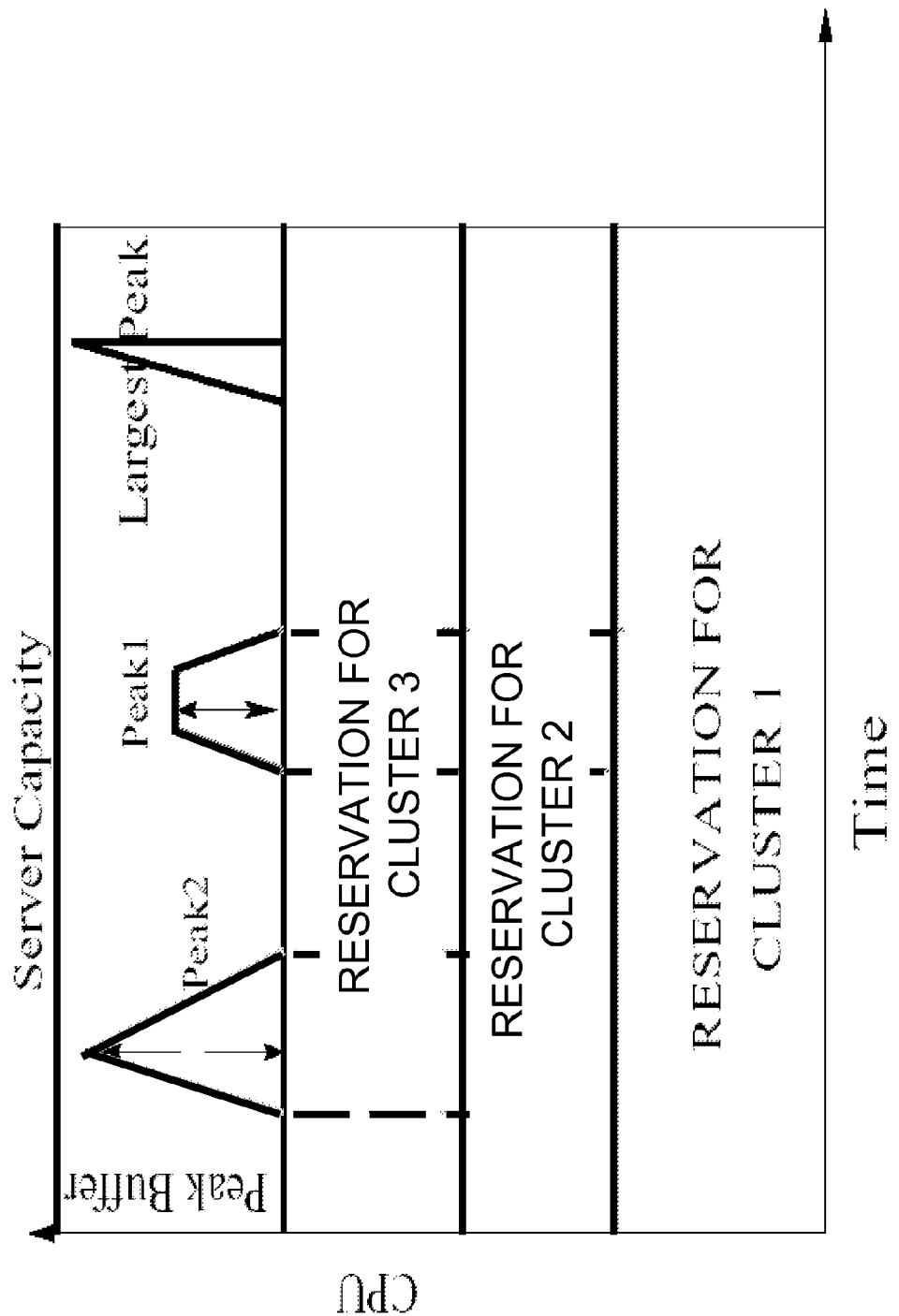
FIG. 6 illustrates CPU utilization for clusters of application workloads.

A non-limiting example server reservation is described in FIG. 6. In this example, there are three clusters and a proportional reservation is made for each cluster that equals $CandSize_k$. Further, capacity is kept spare for peaks and equals the maximum peak across all the three clusters. Since the consolidation can only pick integral solutions, each cluster returns a set of applications whose sizes add up to its proportion, or the last added application may exceed its proportion. Hence, as a final selection step, for each cluster that returns k candidates, the first (k−1) candidates are automatically selected and the last candidate is added to a tentative application pool. Then, the candidates are globally selected from the tentative pool such that the capacity bounds of the server are not violated. In order to reduce fragmentation at all levels of selection, ties are broken between applications by preferring the larger applications first. This allows PCP to strike a balance between reducing fragmentation costs and proportionally selecting applications across different clusters.

Various embodiments of the invention have been extensively evaluated using the proposed methodologies. A brief description of these evaluations is presented herein in order to highlight several key findings.

Performance Comparison:

The methodologies have been implemented as part of an Consolidation Planning Tool from IBM called Emerald. The performance of the proposed methods was evaluated in comparison with Existing methods based on dynamic consolidation. The Existing method was run with two different sizing functions: (i) Peak_Existing sizes all applications based on their peak values; and, (ii) Mode_Existing sizes all applications based on the mode of the distribution. There are essentially three different objectives of consolidation: a) minimize power; b) minimize risk of consolidation; and c) balance workload across active servers.

Figure 7A:
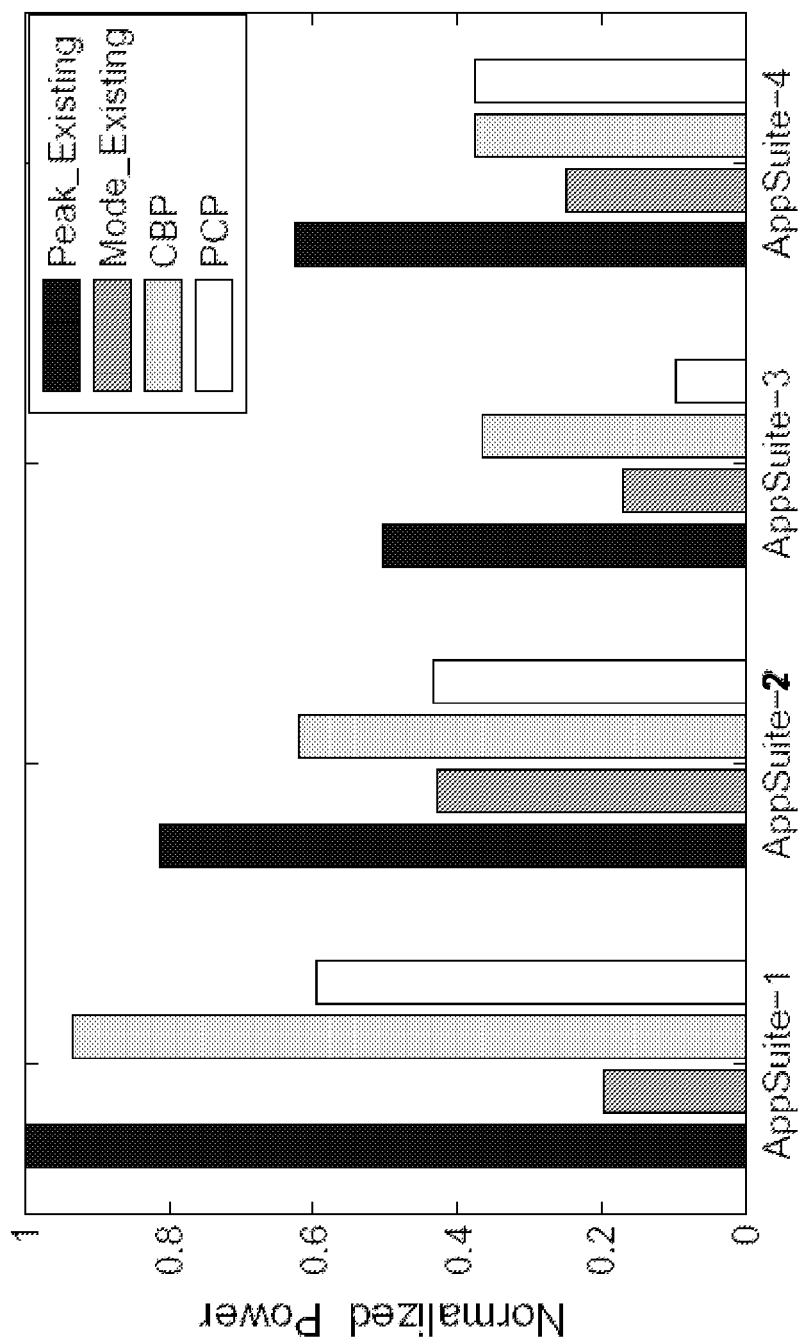
FIG. 7 illustrates exemplary performance evaluation for methods of application workload server consolidation.

Power Consumed and SLA Violations:

FIG. 7(a) illustrates the power consumed in all 4 clusters as a result of placement recommendations made by Peak_Existing, Mode_Existing, CBP and PCP and the corresponding SLA violations. A striking observation is that the Peak_Existing methodology saves no power in "AppSuite-1". A closer look at FIG. 1(a) reveals that barring one application, all other applications in this cluster "AppSuite-1" have a peak CPU utilization of 80 percent or more. Hence, a methodology that sizes applications based on peaks is of no use in this cluster. The overall power consumed by Mode_Existing is typically the lowest as it sizes aggressively, while the Peak_Existing uses the maximum power. On the other hand, Peak_Existing has the lowest violations (typically zero) whereas Mode_Existing has the highest violations. Both CBP and PCP lie midway between these extremes, with PCP attaining about (20-40) percent lower power consumption than CBP and significantly lower violations.

Another observation is that CBP saves significant power in comparison to Peak_Existing in all clusters other than "AppSuite-1", while it faces very high violations for "AppSuite-2". To understand this, it should be noted that the "AppSuite-1" cluster has high correlation, "AppSuite-2" has medium correlation, and the remaining two clusters have a low correlation. As a result, CBP adds many co-location constraints in "AppSuite-1" leading to a large number of active servers and not saving any power. In contrast, the medium correlation in "AppSuite-2" results in CBP not making recommendations to separate these workloads. However, even though the workloads are not correlated, their peaks show up in the same time interval, leading to high violations by CBP. This peak correlation behavior is exploited only in the PCP process, which decides to judiciously separate offending workloads if their simultaneous peaks can risk overshooting the server capacity, thereby causing violations. Thus, PCP sees a nominal number of violations per hour in all clusters.

A surprising result observed is that PCP consumes less power than Mode_Existing for "AppSuite-3". Recall that the server selection methodology in Existing methodology explores locally to reduce migration cost. On the other hand, server selection in PCP can explore new placements that entail a large number of migrations. Since "AppSuite-3" was lightly loaded, consolidation would require large number of migrations. Hence, PCP came up with a different server selection than other methodology for this particular cluster, leading to additional power savings.

Figure 7B:
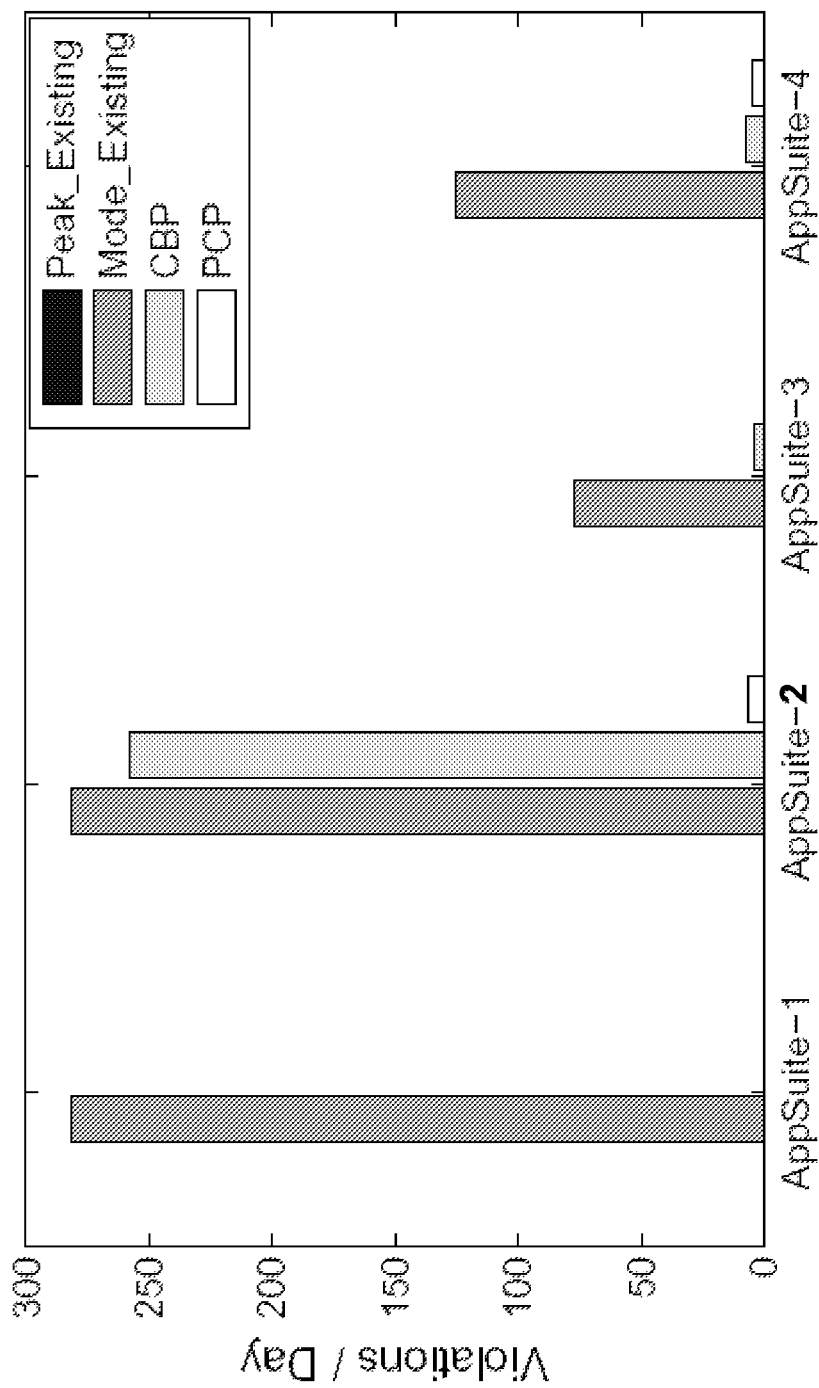

Illustrated in FIG. 7(b) is that Mode_Existing has the potential to save a lot of power but may incur a large number of violations. The correlation in the first two clusters of "AppSuite-1" and "AppSuite-2" especially impacts Mode_Existing, leading to very high violations. Results show that among the 9 active servers in all clusters, 5 of them faced SLA capacity violations. In practice, administrators allow a buffer capacity (typically 10 percent of the server) and hope that any peaks can be served from this buffer capacity. However, even a buffer capacity of 20 percent is not able to handle the "burstiness" of the workload. Amongst 5 servers, the average violation exceeds 20 percent of the server capacity in 4 servers, and the peak violation exceeds the size of the server itself in all the servers. Hence, a workload-unaware strategy that uses a buffer capacity to handle peaks is not feasible in practice.

Workload Balancing:

It was observed that Mode_Existing and CBP have servers that are always overloaded (average utilization of highest loaded server is 100 percent) for "AppSuite-1" and "AppSuite-2". Such a placement is not suitable in practice. Further, for all methodologies other than PCP, there was a large imbalance between the average utilization of the highest loaded server and the average utilization of the cluster. This is a direct consequence of the design of processes, where PCP favors balancing and the other processes favor creating a skew.

In brief recapitulation, presented herein is an exemplary server workload analysis of a large data center, utilized to investigate a large number of characteristics relevant for medium (semi-static) to long term (static) consolidation in order to save power. The exemplary workload study shows that there is a large potential for power savings by using off-peak metrics for sizing applications. However, correlation between applications can lead to significant capacity violations if consolidation methodologies do not take them into account. Accordingly, embodiments of the invention are configured to implement one of two new consolidation methodologies, namely CBP and PCP as described herein, that use an off-peak metric for sizing and another metric to ensure that peaks do not lead to violations. Exemplary experimental evaluation presented herein illustrates that PCP achieves superior power savings, low violations and good load balance across active servers.

It will be readily understood by those having ordinary skill in the art that embodiments of the invention may be implemented using one or more computer systems. In this regard, a non-limiting and exemplary computer system is described herein.

Figure 8:
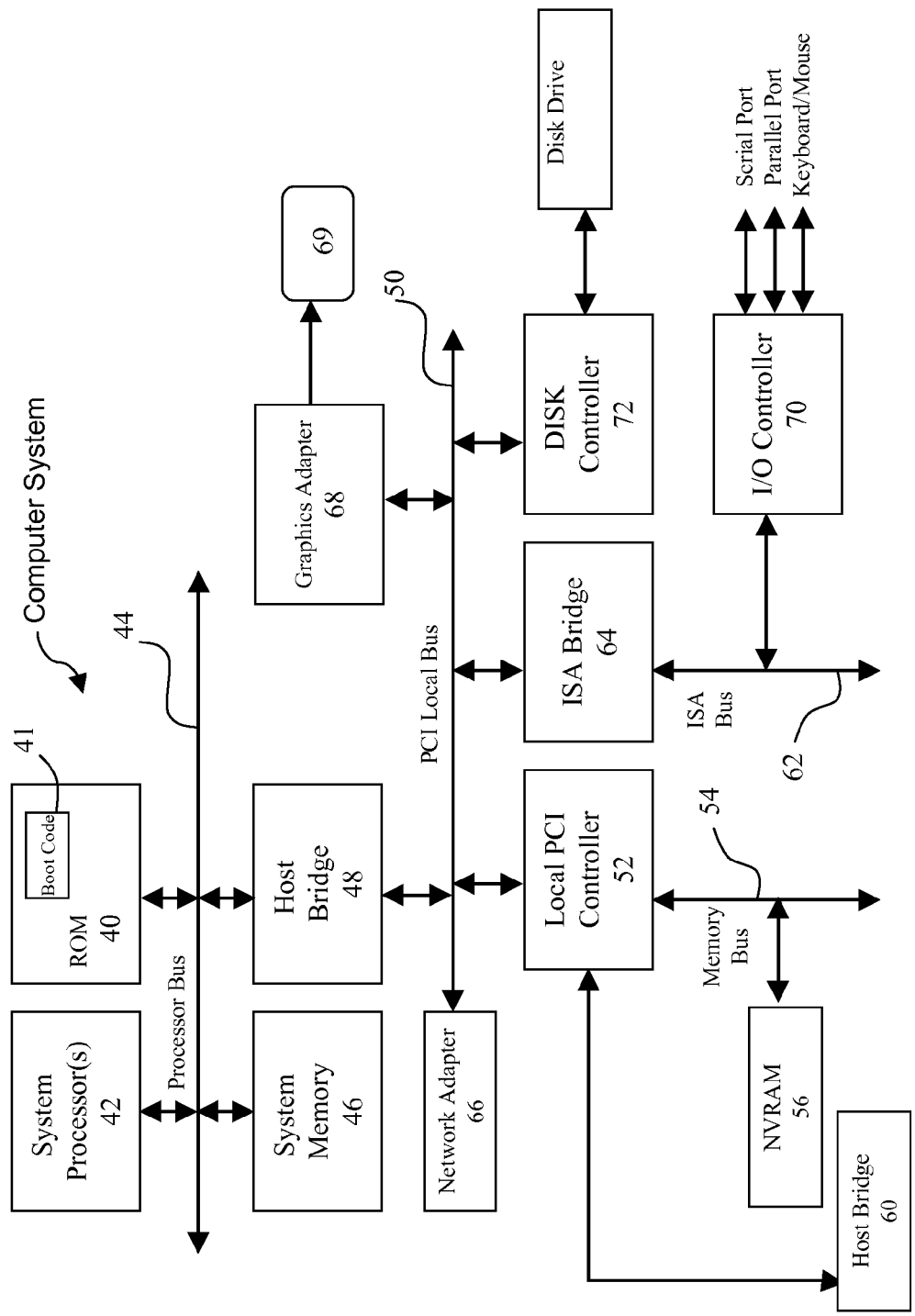
FIG. 8 illustrates an exemplary computer system.

Referring now to FIG. 8, there is depicted a block diagram of an illustrative embodiment of a computer system. The illustrative embodiment depicted in FIG. 8 may be an electronic device such as desktop or workstation computer. As is apparent from the description, however, the embodiments of the invention may be implemented in any appropriately configured device, as described herein.

As shown in FIG. 8, computer system includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system to LAN, and graphics adapter 68, which interfaces computer system to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system further includes Industry Standard Architecture (ISA) bus 62, which is coupled to PCI local bus 50 by ISA bridge 64. Coupled to ISA bus 62 is an input/output (I/O) controller 70, which controls communication between computer system and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

It should be noted as well that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing one or more processors to execute a program of instructions stored in a program storage device, the program of instructions configured for clustering application workloads for placement on one or more servers and comprising:
computer readable program code configured to identify application workloads that are similar and cluster similar workloads to create one or more application workload clusters; and
computer readable program code configured to automatically consolidate application workloads to the one or more servers utilizing a first parameter describing one of the application workloads and a second parameter describing one of the application workloads;
the first parameter representing a typical resource usage of an application workload;
the second parameter representing a maximum resource usage of an application workload.

2. The method according to claim 1, wherein the typical resource usage is a ninety percentile level of resource usage of the application workload.

3. The method according to claim 1, wherein the program of instructions further comprises computer readable program code configured to ensure every selected server at which application workload is to be consolidated has a proportional allocation from each application workload cluster.

4. The method according to claim 2, wherein two applications workloads are defined to be a part of a cluster of application workloads if the two application workloads peak together at the same time.

5. The method according to claim 4, wherein an application workload is defined to be peaking at any time T if utilization of server resources by the application workload exceeds the first parameter at time T.

6. The method according to claim 1, wherein a capacity of the one or more servers is greater than a second parameter of an individual application workload cluster placed on the one or more servers.

7. The method according to claim 1, wherein a capacity of the one or more servers is greater than a sum of first parameters of all application workloads placed on the server.

8. The method according to claim 1, wherein a capacity of the one or more servers is greater than a sum of first parameters of all application workloads placed on the one or more servers and second parameters of the application workloads placed.

9. The method according to claim 1, wherein the program of instructions further comprises computer readable program code configured to ensure that a predetermined maximum number of similar application workloads to be consolidated on any one server is not exceeded.

10. The method according to claim 8, wherein the similar application workloads are defined as application workloads that peak at a similar time.

11. An apparatus comprising:
one or more processors; and
a computer readable storage device having a program of instructions embodied therewith and executable by the one or more processors, the program of instructions comprising:
computer readable program code configured to cluster application workloads to be consolidated; and
computer readable program code configured to automatically consolidate application workloads to the one or more servers utilizing a first parameter describing one of the application workloads and a second parameter describing one of the application workloads;
the first parameter representing a typical resource usage of an application workload;
the second parameter representing a maximum resource usage of an application workload.

12. The apparatus according to claim 11, wherein the typical resource usage is a ninety percentile level of resource usage of the application workload.

13. The apparatus according to claim 11, wherein the program of instructions further comprises computer readable program code configured to ensure every selected server at which application workloads are to be consolidated has a proportional allocation from each clustering of application workloads.

14. The apparatus according to claim 12, wherein two applications workloads are defined to be a part of a cluster of application workloads if the two application workloads peak together at the same time.

15. The apparatus according to claim 14, wherein an application workload is defined to be peaking at any time T if utilization of server resources by the application workload exceeds the first parameter at time T.

16. The apparatus according to claim 11, wherein a capacity of the one or more servers is greater than a second parameter of an individual application workload cluster placed on the one or more servers.

17. The apparatus according to claim 11, wherein a capacity of the one or more servers is greater than a sum of first parameters of all application workloads placed on the server.

18. The apparatus according to claim 11, wherein a capacity of the one or more servers is greater than a sum of first parameters of all application workloads placed on the one or more servers and second parameters of the application workloads placed.

19. The apparatus according to claim 11, wherein the computer readable program code further comprises computer readable program code configured to ensure that a predetermined maximum number of similar application workloads to be consolidated on any one server is not exceeded.

20. A computer program product comprising:
a computer readable storage device having computer readable program code embodied therewith, the computer readable program code comprising:
computer readable program code configured to cluster application workloads to be consolidated; and
computer readable program code configured to automatically consolidate application workloads to the one or more servers utilizing a first parameter describing one of the application workloads and a second parameter describing one of the application workloads;
the first parameter representing a body of the distribution of the application workload use of server capacity;
the second parameter representing a tail of the distribution of the application workload use of server capacity.

* * * * *